United States Patent [19]

Ross

[11] Patent Number: 5,427,662
[45] Date of Patent: Jun. 27, 1995

[54] METHOD FOR PRODUCING AN IONOMER

[75] Inventor: Robert Ross, Ede, Netherlands

[73] Assignee: N.V. Kema, Netherlands

[21] Appl. No.: 146,076

[22] PCT Filed: May 8, 1992

[86] PCT No.: PCT/NL92/00086

§ 371 Date: Nov. 9, 1993

§ 102(e) Date: Nov. 9, 1993

[87] PCT Pub. No.: WO92/20728

PCT Pub. Date: Nov. 26, 1992

[30] Foreign Application Priority Data

May 10, 1991 [NL] Netherlands .................. 9100815

[51] Int. Cl.$^6$ ............................................. B29C 71/04
[52] U.S. Cl. ................................. 204/131; 204/164; 204/165
[58] Field of Search .................... 204/131, 164, 165

[56] References Cited

U.S. PATENT DOCUMENTS

| | | | |
|---|---|---|---|
| 3,124,729 | 3/1964 | Ranalli | 317/262 |
| 4,353,799 | 10/1982 | Leonard | 210/321.3 |
| 4,988,419 | 1/1991 | Rooklyn | 204/157.42 |
| 5,051,159 | 9/1991 | Togashi et al. | 204/165 |
| 5,152,879 | 10/1992 | Thurm et al. | 204/165 |

FOREIGN PATENT DOCUMENTS

| | | |
|---|---|---|
| 2119546 | 8/1972 | France. |
| 1128644 | 4/1962 | Germany. |
| 1348646 | 3/1974 | United Kingdom. |
| 2013213 | 8/1979 | United Kingdom. |

OTHER PUBLICATIONS

G. Kerimo: "Pre-Breakdown Free-Radical States in Polyethylene"; *Chemical Abstracts;* Abstract No. 97:163621v; Nov. 15, 1982.

R. M. A. Alekperov: "Strong Electrical Field Effect on Molecular Mechanism of Polyethylene Degradation"; *Chemical Abstracts;* Abstract No. 110:95925g; Jul. 3, 1989.

G. Kerimov: "Thermoluminescence of Polyethylene Caused By a Strong Electric Field", *Chemical Abstracts;* Abstract No. 91:193764n, Dec. 10, 1979.

*Primary Examiner*—John Niebling
*Assistant Examiner*—Arun S. Phasge
*Attorney, Agent, or Firm*—Webb Ziesenheim Bruening Orkin & Hanson

[57] ABSTRACT

The invention relates to a method for producing an ionomer comprising of: (i) providing a plastic; (ii) placing an electrically conducting medium in contact with a plastic surface of the plastic; and (iii) applying an electrical field over the plastic surface, such that electrically bonded, ionogenic groups occur in the plastic.

20 Claims, No Drawings

METHOD FOR PRODUCING AN IONOMER

The invention relates to a method for producing an ionomer. The invention relates more in particular to the producing of an ionomer from a plastic which initially usually contains no incorporated ion compounds in addition to the normal organic covalent bonds.

This new method for producing ionomers comprises:
i) providing a plastic;
ii) placing an electrically conducting medium in contact with a plastic surface of the plastic; and
iii) applying an electrical field over the plastic surface.

It has been found, namely, that if a plastic is loaded with an electrical field in the presence of an electrically conducting medium, groups are radicalized or ionized from the external and/or internal plastic surface in the direction of the electrical field in the plastic, which groups are converted as a result for instance of oxidation reactions into for example carboxylic acids and/or sulphonic acids. Understood by plastic surface is, among other things, an external plastic surface optionally provided with grooves, scratches or other surface defects and walls of cavities in the plastic which may contain contaminants. Under the influence of the electrically conducting medium these oxidized groups will dissociate and in the presence of metal ions form the characteristic ionogenic, functional groups, i.e. chemically bonded salt groups. Thus formed in the generally amorphous phase of the plastic are hydrophilic channels which are however semi-permeable. The electrically conducting medium, for instance water, is mobile in these channels but hydrated ions can only displace in these channels under the influence of the electrical field. Depending on the nature and composition of the electrically conducting medium and the applied electrical field an ionomer according to the invention can also be provided with cavities in which salts are entrapped.

Both liquids and gases can be used as electrically conducting medium. The latter has the particular objective that the oxidized groups can dissociate and form an ionogenic, functional group with the metal ions supplied by the medium. The electrically conducting medium can be an inorganic medium such as water and ammonia. The electrically conducting medium can likewise be an organic medium such as alkanols, for instance methanol and ethanol. If the electrically conducting medium has an inherent insufficient activity, diverse reactive components can be added to the medium and/or to the plastic.

One group of reactive components consists of gases such as oxygen, ozone, sulphur oxide, for instance sulphur dioxide. Such gases can sustain and assist the radical-forming or ion-forming reactions as well as the oxidation reactions.

Another group of reactive components is formed by salts, particularly salts of multivalent metal ions such as copper, tin and manganese. Such metal ions accelerate the growth of the hydrophilic channels, possibly partly due to a catalytic acceleration of the oxidation reactions.

Another group of reactive components is formed by surface-active substances such as a soap. These surface-active substances, for example a stearate, can on the one hand effect the same function as the salts and on the other reduce the surface tension so that the electrically conducting, more or less polar medium can penetrate more rapidly into the apolar plastic. Other examples of soaps for use comprise alkyl sulphonates, aryl sulphonates, alkyl(aryl) sulphonates and ethylene oxide adducts optionally in combination with alkyl and/or aryl groups.

The magnitude of the electrical field applied over the plastic is not limited to a determined value. A first forming of ionogenic, functional groups already takes place from a value of 1 V/mm of plastic. An upper limit for the magnitude of the electrical field is determined by the short-circuit voltage of the plastic, which voltage can change as the ionomeric character of the plastic increases. A reasonable speed for the forming of the ionogenic, functional groups occurs with an electrical field of 0.2 to 20 kV/mm. If for instance the plastic consists of polyethylene, optimum speeds for the forming of ionogenic, functional groups are obtained when the electrical field amounts to 0.5 to 10 kV/mm. In general, the strongest possible electrical field will be applied, having in practice a value approximately equal to half the short-circuit voltage.

The frequency of the applied field amounts generally to 1 to $10^5$ Hz, preferably 10 Hz to 25 kHz. It has been found however that the magnitude of the frequency can influence the properties of the formed ionomers. For instance at lower frequencies of 5 Hz to 10 kHz mainly electrochemical reactions will occur (oxidation reactions) whereby mainly hydrophilic channels are formed. At higher frequencies, for example from 100 Hz, the ion conduction phenomenon will occur to a greater extent whereby, when the electrically conducting medium contains salts, salts can penetrate into cavities inside the hydrophilic channels and possibly contribute to cavity forming. Once enclosed in these cavities and in the absence of an electrical field, these salts are irreversibly entrapped inside the ionomer.

The ionomer produced according to the invention generally has the form of a sheet. This sheet form may already be present in the plastic subjected to the method. It is however possible that a for example hollow cylindrical plastic is subjected to a radially oriented electrical field, whereafter an ionomer in the form of a sheet is formed from this hollow cylindrical plastic by means of delamination, optionally by peeling.

An optimum method for producing ionomers is obtained if the plastic is placed in contact with the conducting medium on surfaces facing away from each other.

A preferred embodiment for performing the method according to the invention comprises the use of a strip-like plastic which is converted into a channel shape, into which channel liquid, electrically conducting medium is introduced. The channel-shaped plastic is guided through a bath of liquid electrically conducting medium. Into both the bath and into the medium present in the channel is inserted an electrode for applying the electrical field over the plastic strip. By subsequently transporting the strip through the bath, wherein the medium present in the channel moves over the channel-shaped internal surface, the method according to the invention can be performed continuously.

According to a second embodiment of the method according to the invention for producing an ionomer, the plastic, in this case in the form of a plastic foil, can form a partition between two medium chambers each containing for instance gaseous electrically conducting medium (for instance water vapour) and an electrode for generating the electrical field. If a good sealing with the chamber walls is ensured, this method can likewise be converted into a continuous method.

Plastics which can be converted into ionomers with the method according to the invention are in principle not limited to a specific group of plastics, plastics which can particularly be used comprise polyethylene, polypropylene, polystyrene and polytetrafluoroethylene.

The ionomers produced in accordance with the method according to the invention can be applied in very many fields. An example which might be quoted is as ion conductor in for instance polymer batteries, in which the ionomer functions as an electrolyte. The ionomer can also be applied as a semi-permeable membrane with a selective permeability for particular types of molecules and ions, wherein the permeability can moreover be adjusted as a function of the electrical field and/or the temperature. Finally, the ionomers can be used for purifying solutions, dispersions and emulsions of both chemical and medicinal nature.

I claim:

1. A method for producing an ionomer comprising the steps of:
   a) providing a plastic sheet having one or more surfaces;
   b) placing an electrically conducting medium in contact with one or more of said surfaces of said plastic sheet; and
   c) applying an electrical field over one or more of said surfaces and across said plastic sheet, such that electrically and chemically bonded ionogenic groups occur in said plastic of said plastic sheet.

2. The method as claimed in claim 1, wherein the electrically conducting medium is chosen from liquids and/or gases.

3. The method as claimed in claim 1, wherein the electrically conducting medium comprises an inorganic medium.

4. The method as claimed in claim 3, wherein said inorganic medium contains at least one compound selected from the group consisting of water and ammonia.

5. The method as claimed in claim 1, wherein the electrically conducting medium comprises an organic medium.

6. The method as claimed in claim 5, wherein said organic medium is comprised of alkanols.

7. The method as claimed in claim 6, wherein said alkanol is at least one compound selected from the group consisting of methanol and ethanol.

8. The method as claimed in claim 1, wherein the electrically conducting medium contains a reactive gas.

9. The method as claimed in claim 8, wherein said reactive gas is at least one compound selected from the group consisting of oxygen, ozone, and sulphur oxide.

10. The method as claimed in claim 1, wherein at least one of the electrically conducting medium and the plastic of said plastic sheet contains a salt.

11. The method as claimed in claim 1, wherein at least one of the electrically conducting medium and the plastic of said plastic sheet contains a surface-active substance.

12. The method as claimed in claim 11, wherein said surface-active substance is a soap.

13. The method as claimed in claim 1, wherein the strength of said electrical field ranges from approximately 1 Volt/mm plastic to the short-circuit voltage of the plastic of said plastic sheet.

14. The method as claimed in claim 1, wherein the strength of said electrical field is 0.2–20 kV/mm plastic of said plastic sheet.

15. The method as claimed in claim 1, wherein the plastic of said plastic sheet is polyethylene and the strength of said electrical field is 0.5–10 kV/mm polyethylene.

16. The method as claimed in claim 1, wherein the frequency of the electrical field is $1-10^5$ Hz.

17. The method as claimed in claim 1, wherein the frequency of the electrical field is 10 Hz–25 kHz.

18. The method as claimed in claim 1, wherein at least two of said surfaces face away from each other and are placed in contact with said electrically conducting medium.

19. The method as claimed in claim 1, wherein said plastic sheet is formed into a channel and wherein liquid electrically conducting medium is associated with said channel.

20. The method as claimed in claim 1, wherein said plastic sheet forms a partition between chambers wherein said chambers contain said electrically conducting medium.

* * * * *